United States Patent Office 3,234,224
Patented Feb. 8, 1966

3,234,224
CEPHALOSPORANIC ACIDS
Karl Schenker, Basel, Erwin Friedrich Jenny, Riehen, and Bruno Fechtig, Binningen, Switzerland, assignors to Ciba Corporation, New York, N.Y., a corporation of Delaware
No Drawing. Filed Sept. 12, 1963, Ser. No. 308,333
Claims priority, application Switzerland, Oct. 3, 1962, 11,601/62; May 16, 1963, 6,134/63; Aug. 22, 1963, 10,369/63
8 Claims. (Cl. 260—243)

The present invention provides new antibiotics, viz. 7-(hydronaphthyl - mercaptoacetylamino)-cephalosporanic acids, especially 7-(1',2',3',4'-tetrahydronaphthyl-5'-mercaptoacetylamino)-cephalosporanic acid, and its conversion products and salts of said compounds.

7-amino-cephalosporanic acid corresponds to the Formula I, while by its "conversion products" there are to be understood compounds that are converted at the dihydrothiazine ring. As examples of such conversion products there may be mentioned 7-amino-desacetyl-cephalosporanic acid (Formula IIa) and the lactone derived from it (Formula IIb), as well as the inner salts formed when a weak tertiary base or a substitution product thereof is reacted upon a compound of the type of cephalosporin C. The product arising from the reaction with pyridine is accorded the Formula III.

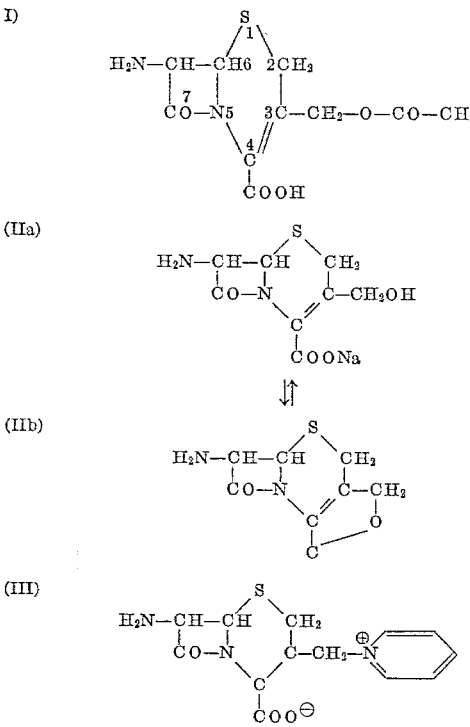

In the new compounds the naphthyl ring may be unsubstituted or substituted e.g. by lower alkyl, such as methyl, ethyl, lower alkoxy, such as methoxy, ethoxy, nitro, amino or halogen, such as fluorine, chlorine or bromine.

The salts of the new compounds are metal salts, primarily salts of therapeutically acceptable alkali metals or alkaline earth metals, such as sodium, potassium, or calcium, or salts of such organic amines as are conventionally used for the manufacture of penicillin salts, e.g. triethylamine or N-ethyl-piperidine. The salts, especially those obtainable in crystalline form, may serve for purifying the compounds, like the sodium salt which is obtained, e.g. by reacting the acid with sodium ethylhexanoate. In view of the close relation between free bases and a base in the form of a salt thereof, whenever a free base is referred to in this context, a corresponding salt is also intended.

Compared with cephalosporin C the new compounds possess valuable properties; for example, they display a stronger antibacterial action, also towards micro-organisms that are resistant to penicillin.

The new compounds may accordingly be used as medicaments in human and veterinary medicine in the form of pharmaceutical preparations, or as additives for feedstuffs, or for the preservation of foodstuffs, or as disinfectants.

The pharmaceutical preparations contain the active compounds in admixture with an organic or inorganic excipient suitable for enteral or parenteral application. Suitable excipients are substances that do not react with the new compounds, for example water, gelatine, lactose, starches, magnesium stearate, talcum, vegetable oils, benzyl alcohols, gums, polyalkylene glycols, chloesterol or other known medicinal excipients. The pharmaceutical preparations may be, for example, tablets or dragees, or in liquid form solutions, suspensions or emulsions. They may be sterilized and/or may contain assistants such as preserving, stabilizing, wetting or emulsifying agents. They may also contain other therapeutically valuable substances.

The new compounds are manufactured by per se conventional methods, for example by reacting 7-amino-cephalosporanic acid, or a product thereof modified at the dihydrothiazine ring, or a functional acid derivative of these compounds, with a hydronaphthylmercapto acetic acid or a functional derivative thereof, and liberating in the resulting compound any protected carboxyl group at the cephalosporan nucleus.

Functional derivatives of hydronaphthylmercaptoacetic acids are, for example, their halides, more especially the chlorides; esters, more especially activated esters such as cyanomethyl esters; azides; pure or mixed anhydrides, for example mixed anhydrides with carbonic acid mono alkyl esters such as carbonic acid monoethyl ester. Functional derivatives of 7-amino-cephalosporanic acid and of the aforementioned conversion products are primarily esters that are easy to split, for example benzyl esters such as benzyl ester itself or benzyl ester substituted with the nitro group, lower alkoxy groups or halogen atoms.

The acylation of the 7-amino-cephalosporanic acid and of the said conversion products is performed, for example, by the Schotten-Baumann method or by the Boissonnas method, taking into consideration the delicacy of these compounds, under mild conditions, advantageously in the presence of a diluent or solvent such as water or an organic solvent, for example an alcohol such as methanol or ethanol, ketone such as acetone, an ether such as tetrahydrofuran, or a halogenated hydrocarbon such as chloroform or methylene chloride, and/or condensing agent and/or buffer. The reaction is performed at room temperature or preferably with cooling, and, if desired, in the presence of an inert gas, such as nitrogen.

When the carboxyl group at the cephalosporan nucleus of the resulting reaction product is functionally converted—for example esterified with a benzyl alcohol—it can be converted into the free carboxyl group in known manner, for example by hydrogenolysis.

Depending on the reaction conditions used the new compounds are obtained in the free form or in the form of their salts. From the salts it is possible to prepare in known manner the acids, or from the acids the salts are accessible for example by reaction with hydroxides, carbonates or bicarbonates of alkali metals or alkaline earth metals, or with organic amines.

The starting materials are known or, insofar as they are new, they can be prepared by known methods.

The following example illustrates the invention.

*Example*

A solution of 241 mg. (1 mmol) of 1,2,3,4-tetrahydronaphthyl-5-mercapto-acetyl chloride in 1 ml. of methylene chloride is added to a solution, cooled with ice, of 272 mg. (1 mmol) of 7-amino-cephalosporanic acid and 0.28 ml. (2 mmols) of triethylamine in 3 ml. of methylene chloride. The reaction mixture is stirred for 3 hours and at the same time allowed to heat up to room temperature. 30 ml. of methylene chloride are added. The batch is acidified with (about 1.2–1.5 ml.) 1 N-hydrochloric acid until a pH of 2 is attained, then washed with 10 ml. of water. The methylene chloride solution is washed again with 10 ml. of water, then dried over anhydrous sodium sulfate, and evaporated carefully. There are obtained 360 mg. of 7-(1',2',3',4'-tetrahydronaphthyl-5'-mercaptoacetylamino)-cephalosporanic acid in the form of a nearly colorless foam. The acid is dissolved in a small amount of warm acetone, treated with 0.3 ml. of a 50% acetonic solution of sodium-α-ethylhexanoate, and the sodium salt caused to crystallize by the addition of petroleum ether. There are obtained 350 mg. of beige-colored crystals melting and decomposing at 170° C.

What is claimed is:

1. 7 - (1',2',3',4' - tetrahydronaphthyl-5'-mercaptoacetylamino)-cephalosporanic acid.
2. An alkali metal salt of 7-(1',2',3',4'-tetrahydronaphthyl-5'-mercaptoacetylamino)-cephalosporanic acid.
3. The sodium salt of 7-(1',2',3',4'-tetrahydronaphthyl-5'-mercaptoacetylamino)-cephalosporanic acid.
4. The triethylamine salt of 7-(1',2',3',4'-tetrahydronaphthyl-5'-mercaptoacetylamino)-cephalosporanic acid.
5. A member selected from the group consisting of 7-(1',2',3',4' - tetrahydronaphthyl-5-mercaptoacetylamino)-cephalosporanic acid and a derivative thereof substituted on the 1',2',3',4'-tetrahydronaphthyl ring by a member selected from the group consisting of lower alkyl, lower alkoxy, nitro, amino and halogeno.
6. A salt of a member selected from the group consisting of 7-(1',2',3',4'-tetrahydromethyl-5-mercaptoacetylamino)-cephalosporanic acid and a derivative thereof substituted on the 1',2',3',4'-tetrahydronaphthyl ring by a member selected from the group consisting of lower alkyl, lower alkoxy, nitro amino and halogeno, said salt being selected from the group consisting of alkali metal, alkaline earth metal and organic amine salts.
7. An alkaline earth metal salt of 7-(1',2',3',4'-tetrahydronaphthyl - 5'-mercaptoacetylamino)-cephalosporanic acid.
8. An organic amine salt of 7-(1',2',3',4'-tetrahydronaphthyl-5'-mercaptoacetylamino)-cephalosporanic acid.

References Cited by the Examiner

FOREIGN PATENTS 615,956   10/1962   Belgium.

OTHER REFERENCES

Jeffrey et al.: Biochemical Journ., vol. 81, pages 591–596 (1961.)

Wertheim: Textbook of Organic Chemistry, pages 763–764 (1945).

Burger: Medicinal Chemistry, page 46 (1960).

NICHOLAS S. RIZZO, *Primary Examiner.*